(12) United States Patent
Wen et al.

(10) Patent No.: US 11,781,669 B1
(45) Date of Patent: Oct. 10, 2023

(54) AIR VALVE

(71) Applicant: TangTring Seating Technology Inc., Huizhou Guangdong (CN)

(72) Inventors: Tsun-Hsiang Wen, Taipei (TW); Shih-Chung Hsu, Taipei (TW); Jun Xie, Taipei (TW); Jian Zeng, Taipei (TW); Xian-Chang Zou, Taipei (TW)

(73) Assignee: TANGTRING SEATING TECHNOLOGY INC., Huizhou Guangdong (CN)

( * ) Notice: Subject to any disclaimer, the term of this patent is extended or adjusted under 35 U.S.C. 154(b) by 22 days.

(21) Appl. No.: 17/743,227

(22) Filed: May 12, 2022

(51) Int. Cl.
*F16K 31/02* (2006.01)
*F16K 31/00* (2006.01)

(52) U.S. Cl.
CPC .......... *F16K 31/002* (2013.01); *F16K 31/025* (2013.01)

(58) Field of Classification Search
CPC ................. F16K 31/002; F16K 31/025; F16K 31/52408; F16K 3/06
USPC .................................................... 251/129.06
See application file for complete search history.

(56) References Cited

U.S. PATENT DOCUMENTS

| | | | | |
|---|---|---|---|---|
| 900,598 | A * | 10/1908 | Schuermann | F16K 31/52408 251/255 |
| 1,011,756 | A * | 12/1911 | Dalen | F16K 31/025 431/18 |
| 5,163,463 | A * | 11/1992 | Gassman | H10N 35/00 251/129.06 |
| 6,776,390 | B1 * | 8/2004 | Boecking | F02M 63/0026 310/346 |
| 7,484,528 | B2 | 2/2009 | Beyerlein et al. | |
| 9,512,829 | B2 * | 12/2016 | Alacqua | F16K 31/44 |
| 9,970,564 | B2 * | 5/2018 | Dankbaar | B60N 2/976 |
| 10,753,494 | B2 * | 8/2020 | Beuschel | F16K 11/052 |
| 10,851,724 | B2 * | 12/2020 | Cho | F16K 31/524 |
| 10,890,268 | B2 * | 1/2021 | Dörfler | F16K 31/025 |
| 11,236,839 | B2 * | 2/2022 | Beuschel | F16K 31/002 |
| 11,536,256 | B2 * | 12/2022 | Dankbaar | B60N 2/665 |
| 2018/0038514 | A1 * | 2/2018 | Kuszneruk | F16K 99/0044 |

FOREIGN PATENT DOCUMENTS

| | | |
|---|---|---|
| CN | 105121928 | 12/2015 |
| CN | 109296807 | 2/2019 |
| CN | 109386642 | 2/2019 |

(Continued)

*Primary Examiner* — Umashankar Venkatesan
(74) *Attorney, Agent, or Firm* — Muncy, Geissler, Olds & Lowe, P.C.

(57) ABSTRACT

An air valve comprises a casing, a valve body driving assembly and a valve body. The casing comprises a chamber, a vent hole, and at least one switching hole communicating with the chamber. The valve body driving assembly is disposed in the chamber, and comprises a pusher, a shape memory metal wire in a linkage relationship with the pusher, and two conductive members disposed in the casing and located at two ends of the shape memory metal wire respectively, the pusher travels a uniaxial displacement stroke due to a temporary change of the shape memory metal wire. The valve body is disposed in the chamber and faces the switching hole, when the pusher travels the uniaxial displacement stroke, the valve body is driven to rotate a central angle relative to the switching hole to change a ventilation state between the switching hole and the chamber.

14 Claims, 6 Drawing Sheets

(56) References Cited

FOREIGN PATENT DOCUMENTS

| | | |
|---|---|---|
| CN | 109780271 | 5/2019 |
| CN | 110345304 | 10/2019 |
| CN | 111668612 | 9/2020 |
| DE | 102021203190 A1 * | 10/2022 |

* cited by examiner

AIR VALVE

FIELD OF THE INVENTION

The invention relates to an air valve, and more particularly to an air valve which uses a shape memory metal wire to drive a valve body to work indirectly.

BACKGROUND OF THE INVENTION

Shape memory alloy (SMA) is a metal alloy with shape memory effect. When the shape memory alloy is in a temperature lower than the phase transition temperature (such as room temperature), it has a martensite structure. This metallographic structure causes the shape memory alloy capable of deforming after receiving an external force, and capable of maintaining its deformed state continuously when the external force is removed. This phenomenon is called shape memory effect (SME). When the shape memory alloy is heated above the phase transition temperature, the metallographic structure of the shape memory alloy changes from martensite to austenite structure, and the shape memory alloy changes its state through changes of the metallographic structure. When the shape memory alloy falls below the phase transition temperature again, the shape memory alloy releases the stress and restores to the original state before deformation. Currently, the shape memory effect of shape memory alloy is widely used in valve elements, and the action of valve elements is controlled through shape memory alloy.

In addition, U.S. Pat. No. 7,484,528B2, CN Patent No. 109780271, CN Patent No. 109386642 use the shape memory alloy to drive the valve body, but the shape memory alloy is directly located on the air flow path of the valve, causing the working temperature of the shape memory alloy to be easily affected by the gas flowing through, resulting in a risk of incapable of controlling reliably. In addition to the foregoing, CN Patent No. 111668612, CN Patent No. 110345304, CN Patent No. 109296807, and CN Patent No. 105121928 also use the shape memory alloy to drive the valve body, but in the above patents, the shape memory alloy is used as the direct driver for the state switching of the valve body; however, frequent changes of the valve body, as well as the air pressure factor encountered by the valve body during the switching process, are likely to cause excessive wear and tear of the shape memory alloy, affecting the number of times of use and service life.

SUMMARY OF THE INVENTION

A main object of the invention is to solve the problem of excessive wear and tear of a shape memory alloy due to a direct drive design employed in the conventional structure.

In order to achieve the above object, the invention provides an air valve comprising a casing, a valve body driving assembly and a valve body. The casing comprises a chamber, a vent hole, and at least one switching hole communicating with the chamber. The valve body driving assembly is disposed in the chamber, and comprises a pusher, a shape memory metal wire in a linkage relationship with the pusher, and two conductive members disposed in the casing and located at two ends of the shape memory metal wire respectively, the pusher travels a uniaxial displacement stroke due to a temporary change of the shape memory metal wire. The valve body is disposed in the chamber and faces the switching hole, when the pusher travels the uniaxial displacement stroke, the valve body is driven to rotate a central angle relative to the switching hole to change a ventilation state between the switching hole and the chamber.

In one embodiment, the pusher is provided with a pushing portion thereon, and the valve body is provided with a pushed portion connected with the pushing portion.

In one embodiment, the pushing portion is a protruding rod, the pushed portion is a track disposed around a periphery of the valve body, the track is composed of a plurality of first slope sections and a plurality of second slope sections, a sign of a slope of the first slope sections is opposite to a sign of a slope of the second slope sections, the plurality of first slope sections and the plurality of second slope sections are arranged alternately so that the track is formed with a plurality of high points and a plurality of low points.

In one embodiment, the switching hole and the vent hole are located on a same side of the chamber.

In one embodiment, the casing comprises at least the two switching holes, the at least two switching holes are disposed adjacent to each other, the at least two switching holes and the vent hole are located on a same side of the chamber, when the pusher travels the uniaxial displacement stroke, the valve body is driven to rotate a central angle relative to the at least two switching holes to change a ventilation state between at least one of the two switching holes and the chamber.

In one embodiment, the air valve comprises a first spring connected to the valve body, and the first spring provides the valve body with an acting force to displace toward the switching hole.

In one embodiment, the valve body driving assembly comprises a second spring connected to the pusher, and the second spring provides the pusher with a reset acting force when the shape memory metal wire resets.

In one embodiment, the valve body driving assembly is disposed side by side with the valve body.

In one embodiment, the casing is formed with a guideway for restricting a movement trajectory of the pusher in the uniaxial displacement stroke.

In one embodiment, the pusher is formed with a guided portion matching with the guideway.

In one embodiment, the guideway is a groove-like structure, and the guided portion is a protruding rib formed on an outer surface of the pusher.

In one embodiment, the pusher comprises a rod body and a fastener disposed on the rod body and used for connecting the shape memory metal wire.

In one embodiment, the casing comprises at least two mounting blocks disposed in the chamber for mounting the valve body driving assembly and the valve body.

Through the aforementioned implementation, the invention has the following features compared to the prior art: the shape memory metal wire of the invention does not drive the valve body to operate directly, but is implemented to drive the valve body indirectly to avoid excessive wear and tear of the shape memory metal wire.

DETAILED DESCRIPTION OF THE PREFERRED EMBODIMENTS

Figure 1:
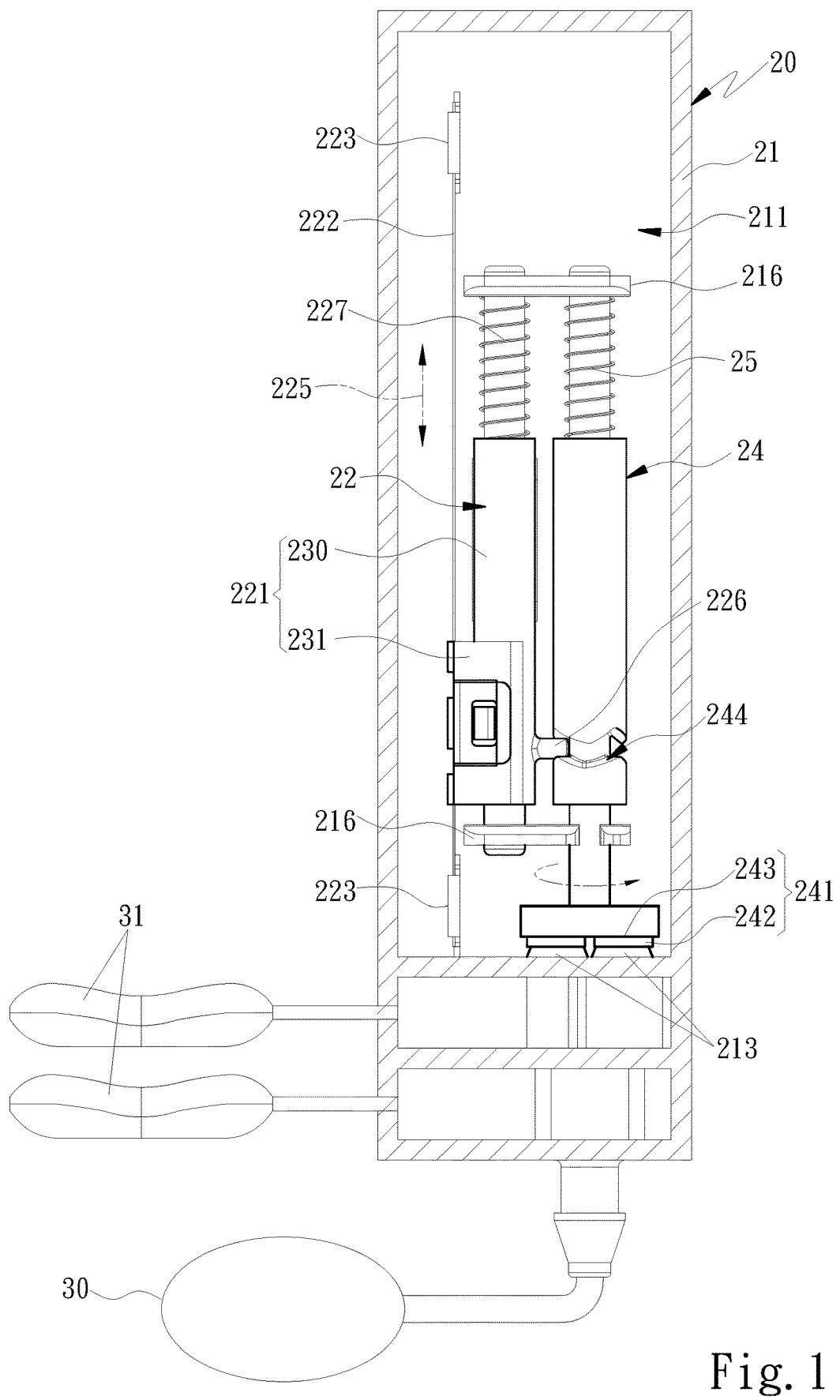
FIG. 1 is a schematic structural diagram of implementation of an embodiment of an air valve of the invention.

The detailed description and technical content of the invention are described below with reference to the accompanying drawings.

Please refer to FIG. 1, FIG. 2, FIG. 3, FIG. 4 and FIG. 5, the invention provides an air valve 20, the air valve 20 can be used to control inflation or deflation of at least one air bag 31. The air valve 20 comprises a casing 21, a valve body driving assembly 22 and a valve body 24. The casing 21 comprises a chamber 211, a vent hole 212, and a switching hole 213 communicating with the chamber 211. For specific description herein, it is assumed that the vent hole 212 can be an air inlet end by connecting to an air pump 30, and the switching hole 213 can be an air outlet end by connecting to the air bag 31. In one embodiment, the switching hole 213 and the vent hole 212 are located on a side where the chamber 211 is located. In addition, an air flow path can be defined when both the switching hole 213 and the vent hole 212 are open. Furthermore, the vent hole 212 and the switching hole 213 of the invention are not limited to the foregoing example, and can be used as an air outlet end or an air inlet end according to design requirements.

Please refer to FIG. 1, FIG. 2, FIG. 3 and FIG. 4, the valve body driving assembly 22 is disposed in the chamber 211, the valve body driving assembly 22 comprises a pusher 221, a shape memory metal wire 222 in a linkage relationship with the pusher 221, and two conductive members 223 disposed in the casing 21 and located at two ends of the shape memory metal wire 222 respectively. The conductive members 223 are respectively connected with a conductive wire 224 to form a conductive loop. On the other hand, the valve body 24 is disposed in the chamber 211, and can further be disposed side by side with the valve body driving assembly 22. The valve body 24 faces the switching hole 213, a ventilation state between the switching hole 213 and the chamber 211 can be changed when the valve body 24 is operated each time. Further, one side of the valve body 24 facing the switching hole 213 can be a concave-convex surface 241, and at least one protruding portion 242 on the concave-convex surface 241 presses against the switching hole 213, so that the switching hole 213 is pressed to be closed. Conversely, a remaining portion 243 of the concave-convex surface 241 besides the protruding portion 242 is not in contact with the switching hole 213 when the valve body 24 presses against the switching hole 213, so that the switching hole 213 is in a released state. Accordingly, the valve body 24 is capable of determining a state of the switching hole 213 through the concave-convex surface 241 and the switching hole 213.

Operation of the air valve 20 of the invention will be described hereinafter. In the invention, when a temperature of the shape memory metal wire 222 rises after being electrified to reach a condition for changing shape, and a deformed state of the shape memory metal wire 222 will occur. However, the invention does not keep the shape memory metal wire 222 in the deformed state for a long period of time, the shape memory metal wire 222 is restored to its original shape right after the deformed state occurs. The pusher 221 travels a uniaxial displacement stroke 225 during a transitory back and forth change of the shape memory metal wire 222, and the uniaxial displacement stroke 225 comprises a linear trajectory. At the same time, the valve body 24 is driven synchronously when the pusher 221 travels the uniaxial displacement stroke 225, and the valve body 24 rotates a central angle when the pusher 221 completes the uniaxial displacement stroke 225. In one embodiment, the central angle is 120 degrees. Rotation of the valve body 24 relative to the switching hole 213 will change the ventilation state between the switching hole 213 and the chamber 211. When the air valve 20 needs to change an air supply state again due to operation, the above-mentioned actions only need to be repeated so that the valve body 24 and the switching hole 213 can meet an air supply requirement. In addition, since a time of the shape memory metal wire 222 being electrified in the invention is reduced, a number of times of use of the shape memory metal wire 222 can be increased, and a service life of the shape memory metal wire 222 can be prolonged. Furthermore, the shape memory metal wire 222 of the invention does not drive the valve body 24 to operate directly, but is implemented to drive the valve body 24 indirectly to avoid excessive wear and tear of the shape memory metal wire 222. In addition to the above, although the shape memory metal wire 222 of the invention is disposed in the chamber 211, the shape memory metal wire 222 is not directly located on the air flow path, so that the temperature of the shape memory metal wire 222 can be ensured, and a state of the shape memory metal wire 222 can be specifically controlled.

Please refer to FIG. 1, FIG. 2, FIG. 3 and FIG. 4. In one embodiment, the casing 21 comprises at least the two switching holes 213, and the at least two switching holes 213 are disposed adjacent to each other. The valve body 24 faces the two switching holes 213 at the same time, and the valve body 24 is driven to rotate the central angle relative to the at least two switching holes 213 when the pusher 221 travels the uniaxial displacement stroke 225, thereby changing a ventilation state between at least one of the two switching holes 213 and the chamber 211. For example, one of the at least two switching holes 213 that is originally closed turns into being released, or one of the at least two switching holes 213 that is originally released turns into being closed. Further, in one embodiment, the at least two switching holes 213 and the vent hole 212 are located on a side where the chamber 211 is located.

Figure 2:
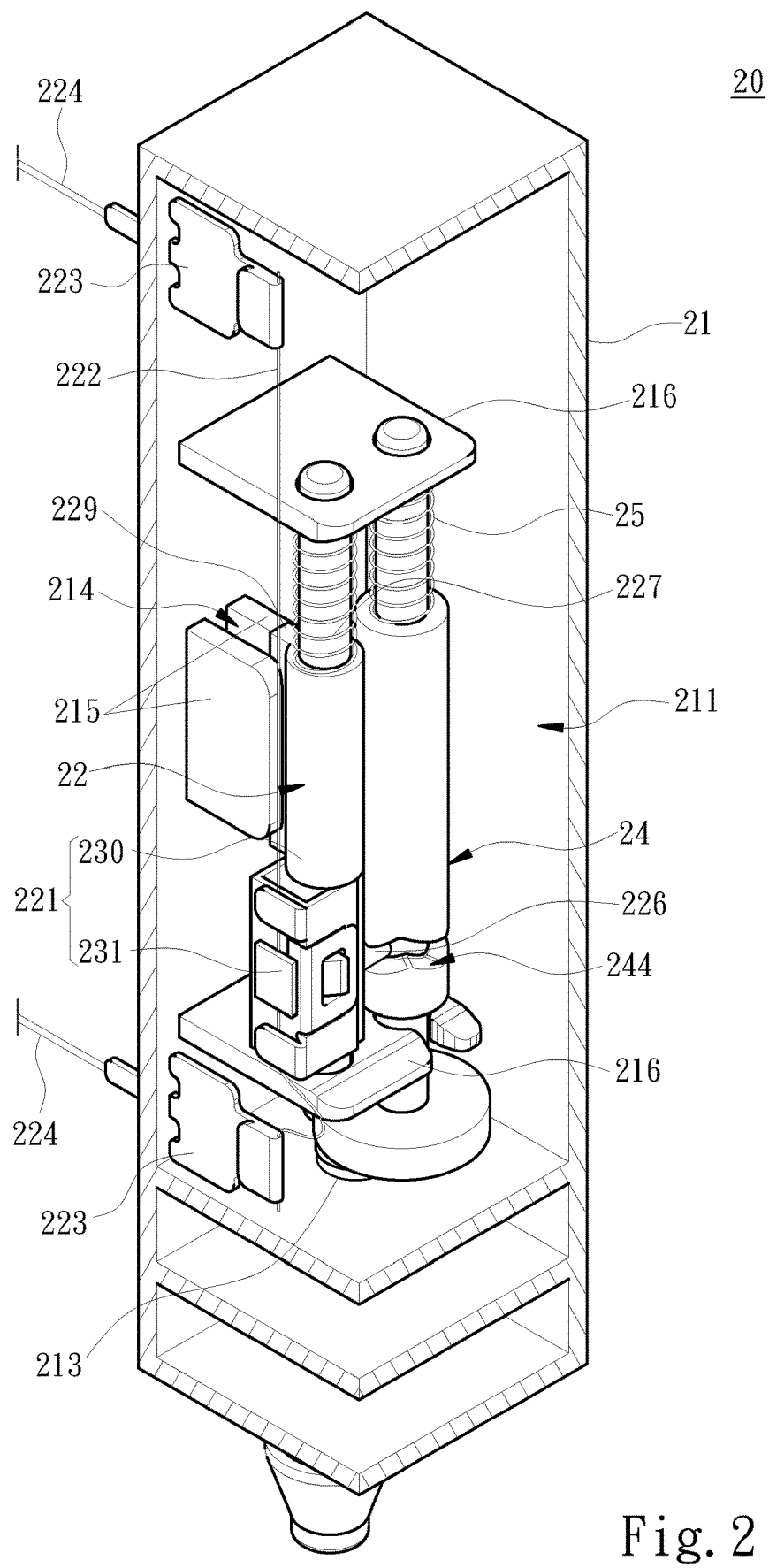
FIG. 2 is a perspective structural view of an embodiment of the air valve of the invention.
Figure 4:
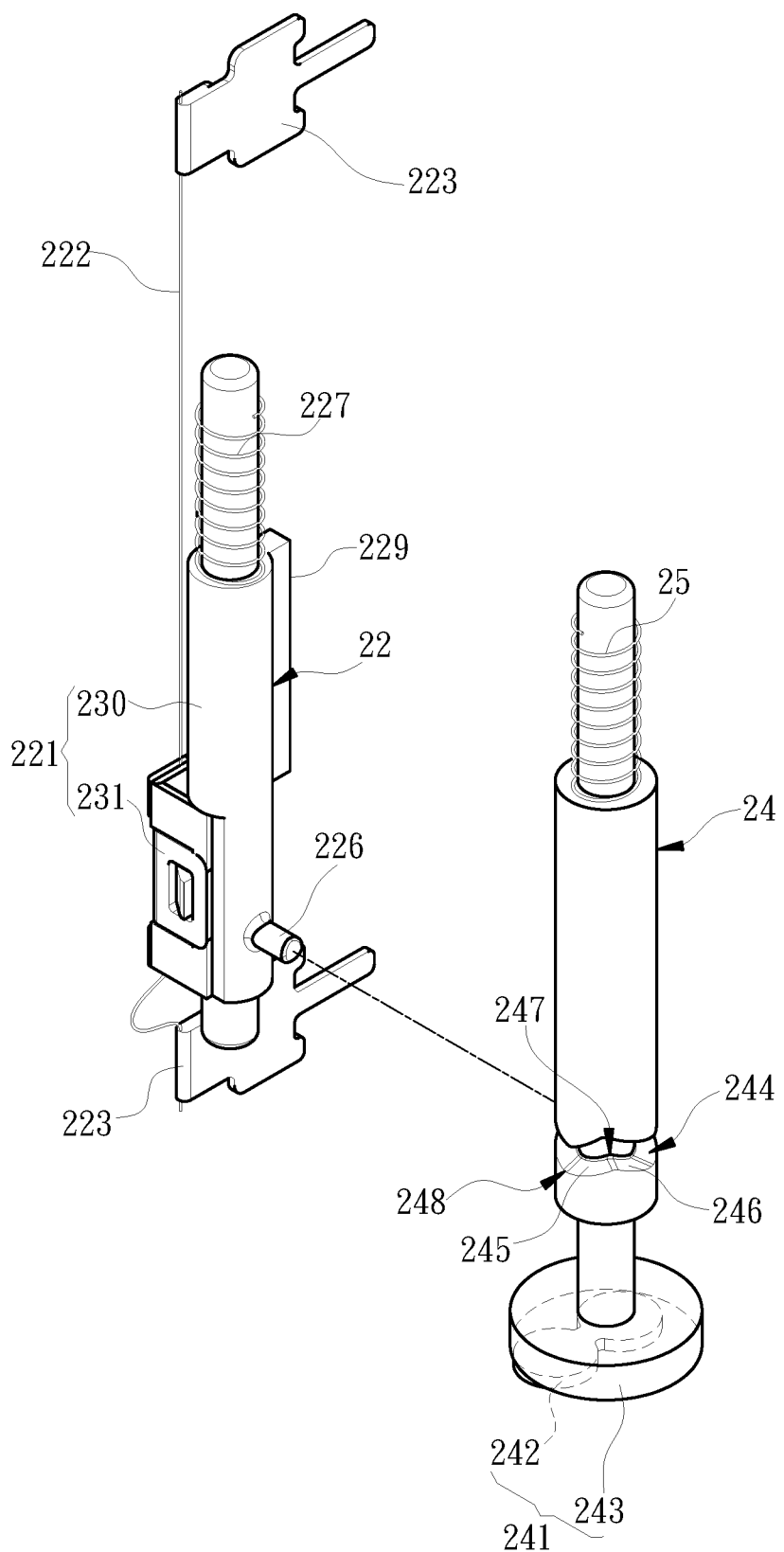
FIG. 4 is a perspective view of a partial structure of an embodiment of the air valve of the invention.
Figure 6:
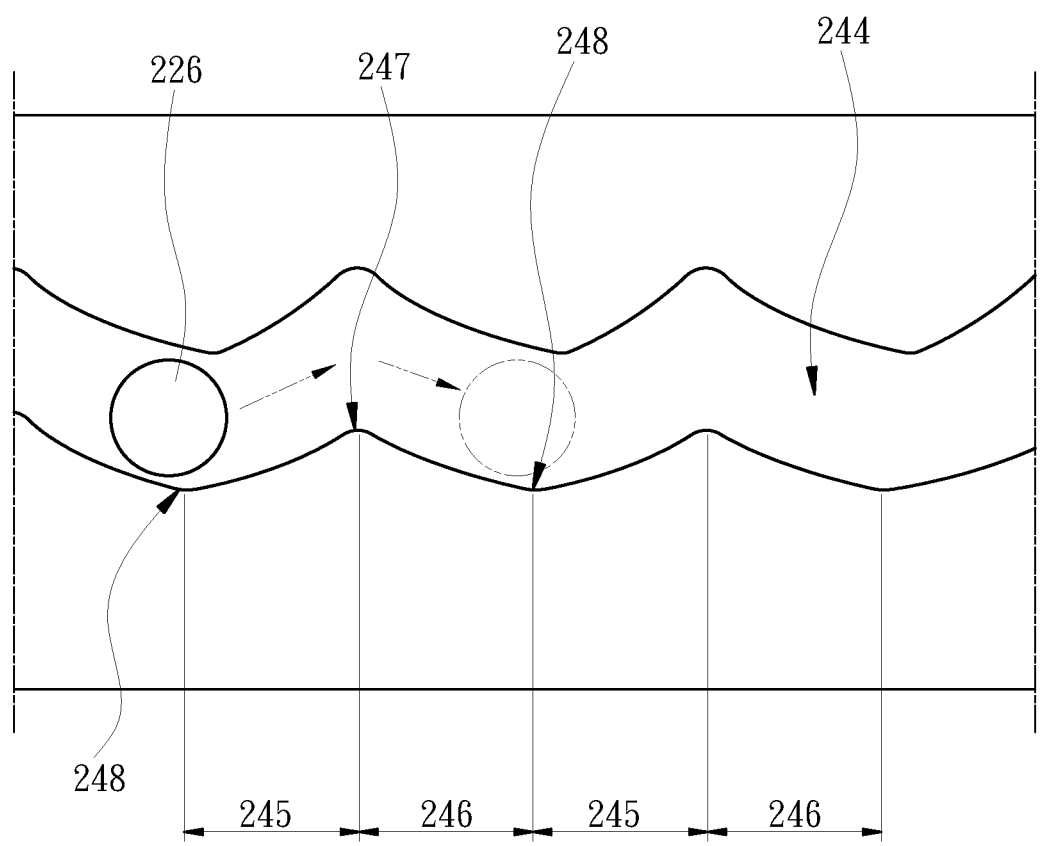
FIG. 6 is an expanded schematic diagram of a pushed portion of an embodiment of the air valve of the invention.

Please refer to FIG. 2, FIG. 4 and FIG. 6. In one embodiment, the pusher 221 is provided with a pushing portion 226 thereon, and the valve body 24 is provided with a pushed portion 244 connected to the pushing portion 226. Further, the pushing portion 226 can be a protruding rod, the pushed portion 244 can be a track disposed around a periphery of the valve body 24, the track is composed of a plurality of first slope sections 245 and a plurality of second slope sections 246, a sign of a slope of the plurality of first slope sections 245 is opposite to a sign of a slope of the plurality of second slope sections 246, the plurality of first slope sections 245 and the plurality of second slope sections 246 are arranged alternately so that the track is formed with a plurality of high points 247 and a plurality of low points 248. In this embodiment, the pushing portion 226 is located at one of the plurality of low points 248 of the track when the pusher 221 has yet to travel the uniaxial displacement stroke 225. When the pusher 221 travels the uniaxial displacement stroke 225, the pushing portion 226 is displaced from one of the plurality of low points 248 originally located to one of the plurality of high points 247 adjacent thereto, and then displaced to one of the other low points 248 adjacent to the one of the plurality of high points 247 in a same rotation direction. The pushed portion 244 on the valve body 24 is rotated due to operation of the pushing portion 226. Further, in one embodiment, an entire path of the pushed portion 244 served as the track can be a continuous triangular shape or a continuous wavy shape.

Figure 5:
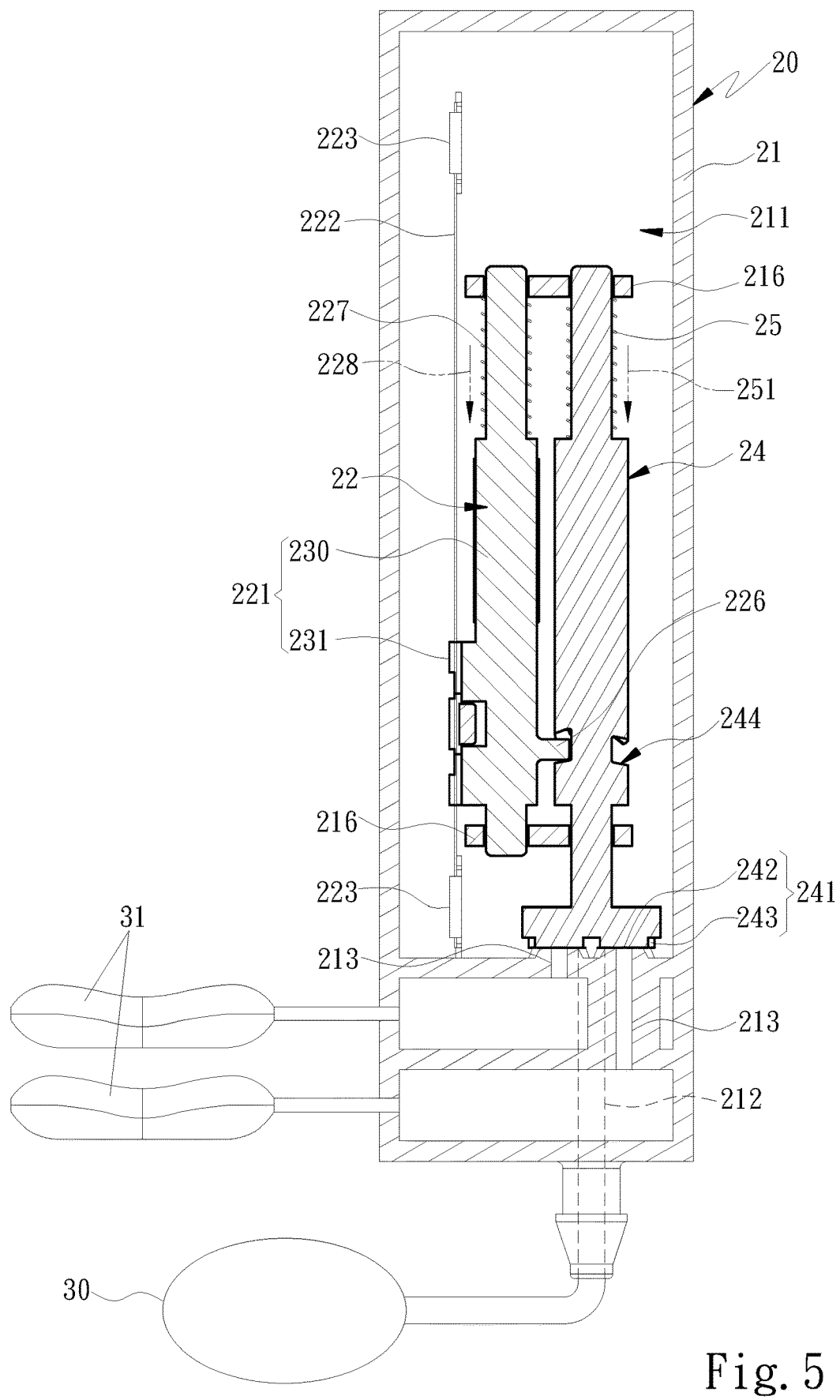
FIG. 5 is a cross-sectional view of a structure of an embodiment of the air valve of the invention.

Please refer to FIG. 5. In one embodiment, the air valve 20 comprises a first spring 25 connected to the valve body 24, and the first spring 25 provides the valve body 24 with an acting force 251 to displace toward the switching hole 213. On the other hand, the valve body driving assembly 22 comprises a second spring 227 connected to the pusher 221, and the second spring 227 provides the pusher 221 with a reset acting force 228 when the shape memory metal wire 222 resets.

Figure 3:
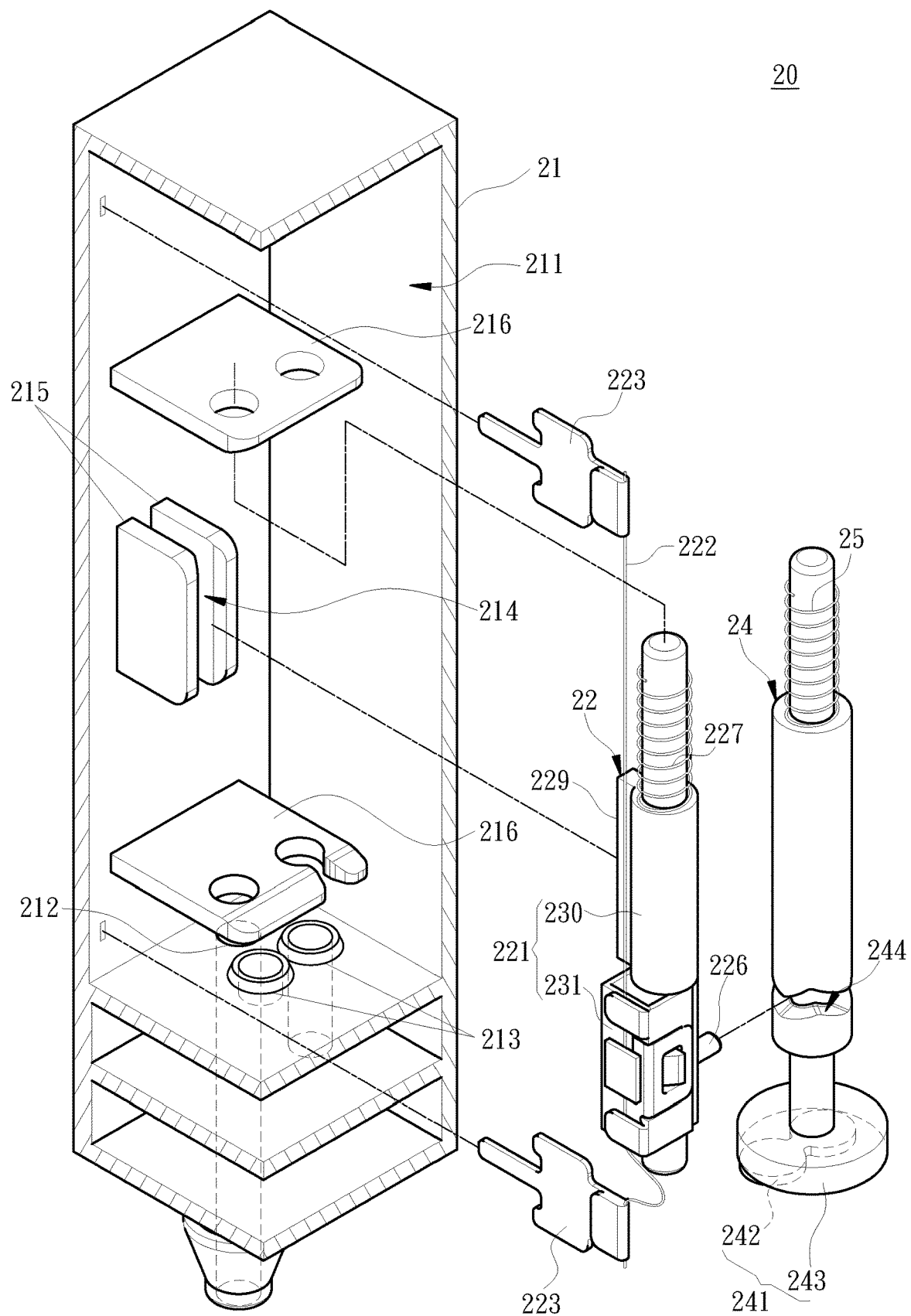
FIG. 3 is a perspective exploded view of a structure of an embodiment of the air valve of the invention.

Please refer to FIG. 1, FIG. 2 and FIG. 3. In one embodiment, the casing 21 is formed with a guideway 214 for restricting a movement trajectory of the pusher 221 in the uniaxial displacement stroke 225. A structure of the guideway 214 can be adjusted according to design requirements. The guideway 214 can be used to restrict a movement trajectory of a main structure of the pusher 221, or the guideway 214 can be implemented in cooperation with only a partial structure of the pusher 221. Accordingly, in one embodiment, the pusher 221 is formed with a guided portion 229 which is matched with the guideway 214. In the embodiment shown in the drawings of the invention, the guideway 214 is jointly defined by two guide walls 215 extending from an inner wall of the chamber 211 and disposed at an interval, that is, the guideway 214 is a groove-like structure. In addition, the guided portion 229 is a protruding rib formed on an outer surface of the pusher 221, and the protruding rib is designed to be capable of moving along the guideway 214. Furthermore, in the aforementioned embodiment herein, the guideway 214 is concave and the guided portion 229 is convex for illustration; however, a concave-convex relationship between the guideway 214 and the guided portion 229 can be reversed, that is, the guideway 214 is convex, and the guided portion 229 is concave.

Please refer to FIG. 2 and FIG. 3. In one embodiment, the pusher 221 comprises a rod body 230 and a fastener 231 disposed on the rod body 230 and used for connecting the shape memory metal wire 222. The fastener 231 can be implemented in an integrated structure, and can further have a structure for fixing the shape memory metal wire 222. In one embodiment, the fastener 231 can be a metal spring leaf Through this embodiment of the invention, the shape memory metal wire 222 can be installed on or dismounted from the rod body 230 more conveniently.

Please refer to FIG. 2 and FIG. 3. In one embodiment, the casing 21 comprises at least two mounting blocks 216 disposed in the chamber 211 for mounting the valve body driving assembly 22 and the valve body 24. The two mounting blocks 216 can be disposed at an interval, and are provided for two ends of the valve body driving assembly 22 and the valve body 24 to be respectively disposed thereon, so that the valve body driving assembly 22 and the valve body 24 can be stably implemented.

What is claimed is:

1. An air valve, comprising:
    a casing comprising a chamber, a vent hole, and at least one switching hole communicating with the chamber;
    a valve body driving assembly disposed in the chamber, and comprising a pusher, a shape memory metal wire in a linkage relationship with the pusher, and two conductive members disposed in the casing and located at two ends of the shape memory metal wire respectively, the pusher traveling a uniaxial displacement stroke due to a temporary change of the shape memory metal wire; and
    a valve body disposed in the chamber and facing the switching hole, when the pusher traveling the uniaxial displacement stroke, the valve body being driven to rotate a central angle relative to the switching hole to change a ventilation state between the switching hole and the chamber.

2. The air valve as claimed in claim 1, wherein the pusher is provided with a pushing portion thereon, and the valve body is provided with a pushed portion connected with the pushing portion.

3. The air valve as claimed in claim 2, wherein the pushing portion is a protruding rod, the pushed portion is a track disposed around a periphery of the valve body, the track is composed of a plurality of first slope sections and a plurality of second slope sections, a sign of a slope of the plurality of first slope sections is opposite to a sign of a slope of the plurality of second slope sections, the plurality of first slope sections and the plurality of second slope sections are arranged alternately so that the track is formed with a plurality of high points and a plurality of low points.

4. The air valve as claimed in claim 1, wherein the switching hole and the vent hole are located on a same side of the chamber.

5. The air valve as claimed in claim 4, wherein the pusher comprises a rod body and a fastener disposed on the rod body and used for connecting the shape memory metal wire.

6. The air valve as claimed in claim 1, wherein the casing comprises at least two switching holes, the at least two switching holes are disposed adjacent to each other, the at least two switching holes and the vent hole are located on the same side of the chamber, when the pusher travels the uniaxial displacement stroke, the valve body is driven to rotate the central angle relative to the two switching holes to change a ventilation state between at least one of the two switching holes and the chamber.

7. The air valve as claimed in claim 1, wherein the air valve comprises a first spring connected to the valve body, and the first spring provides the valve body with an acting force to displace toward the switching hole.

8. The air valve as claimed in claim 7, wherein the valve body driving assembly comprises a second spring connected to the pusher, and the second spring provides the pusher with a reset acting force when the shape memory metal wire resets.

9. The air valve as claimed in claim 7, wherein the valve body driving assembly is disposed side by side with the valve body.

10. The air valve as claimed in claim 9, wherein the casing is formed with a guideway for restricting a movement trajectory of the pusher in the uniaxial displacement stroke.

11. The air valve as claimed in claim 10, wherein the pusher is formed with a guided portion matching with the guideway.

12. The air valve as claimed in claim 10, wherein the guideway is a groove-like structure, and the guided portion is a protruding rib formed on an outer surface of the pusher.

13. The air valve as claimed in claim 12, wherein the pusher comprises a rod body and a fastener disposed on the rod body and used for connecting the shape memory metal wire.

14. The air valve as claimed in claim 1, wherein the casing comprises at least two mounting blocks disposed in the chamber for mounting the valve body driving assembly and the valve body.

* * * * *